Oct. 1, 1929.  J. C. EICHELBERGER  1,729,868
AUTOMATIC REEL ADJUSTMENT FOR HEADERS
Filed Dec. 12, 1927
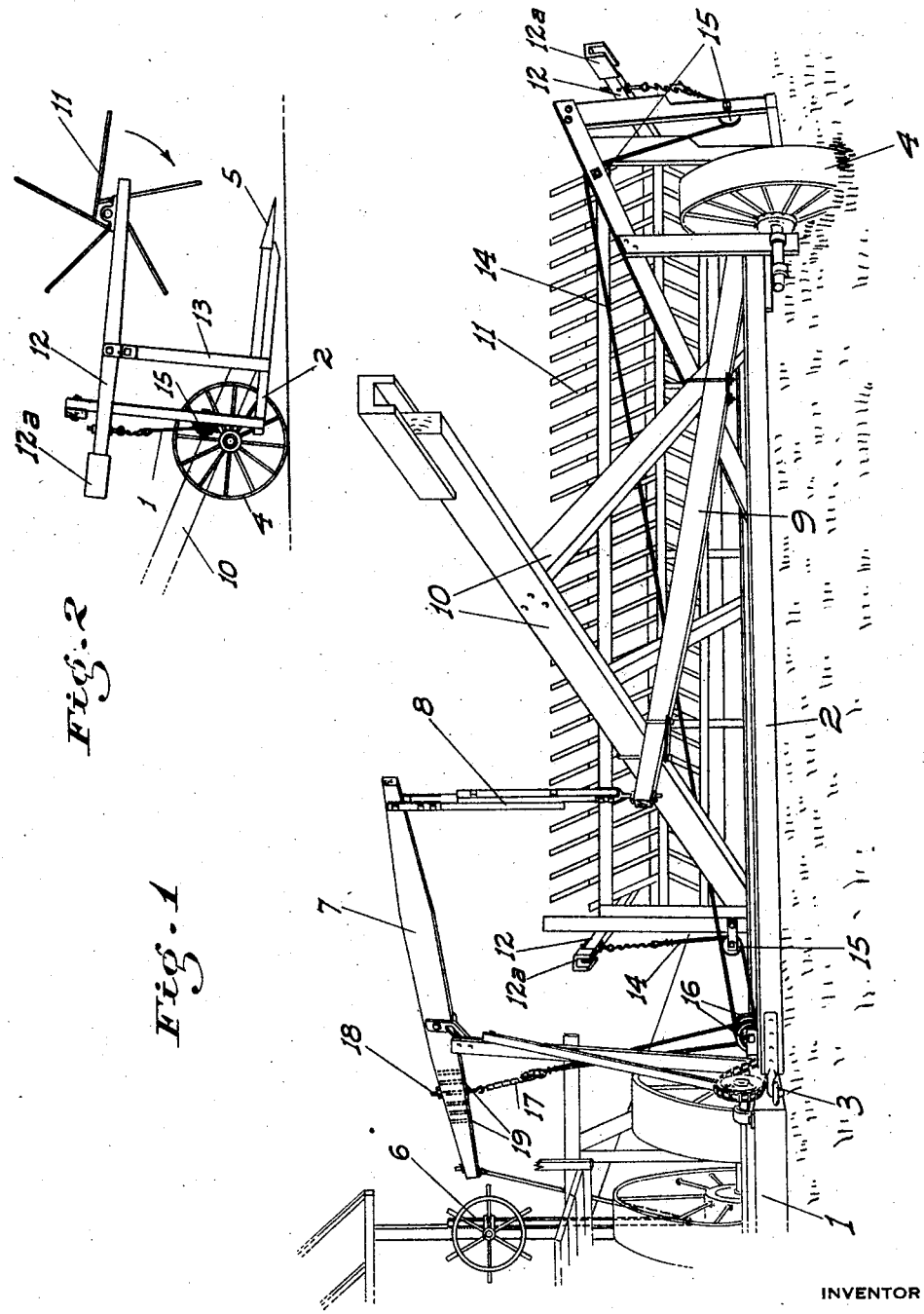
INVENTOR
J. C. Eichelberger
BY
ATTORNEY Patented Oct. 1, 1929

1,729,868

UNITED STATES PATENT OFFICE

JOHN C. EICHELBERGER, OF STOCKTON, CALIFORNIA

AUTOMATIC REEL ADJUSTMENT FOR HEADERS

Application filed December 12, 1927. Serial No. 239,299.

This invention relates to headers, my principal object being to provide an arrangement operable in conjunction with the usual cutter bar raising mechanism of the header for causing the reel to be automatically raised to a greater extent than the bar. This adjustment is particularly valuable when operating the header in tall growths, in which the reel as usually disposed is so low that it tends to beat down the crop rather than properly engage and pass it on to the draper of the header.

A further object of the invention is to provide an arrangement for the purpose which may be applied to any standard header and its control or adjustment mechanism without necessitating any material alterations being made thereto.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a perspective view of a header with its adjustment mechanism showing my improved reel adjusting structure applied thereto.

Fig. 2 is a fragmentary side elevation of the header showing the mounting of the reel supporting arms.

Referring now more particularly to the numerals of reference on the drawings, 1 denotes a thresher projecting laterally from which is the header whose frame structure 2 is flexibly connected to the thresher for limited vertical movement as indicated at 3. The frame 2 at its outer end is supported by a wheel 4. Mounted on the frame 2 ahead of the wheel is the usual knife or cutter bar structure 5.

The vertical tilting of the header frame about the wheel as an axis, to cause the level of cutting of the cutter bar to be altered, is accomplished by the usual means. Such means comprise a vertical hand adjustable rack 6 mounted on the thresher which is operatively connected to the adjacent end of a horizontal walking beam 7 which is pivoted intermediate its ends on the thresher and overhangs the header rearwardly of the axial plane of the wheel 4. From the outer end of the beam 7 a link 8 depends to a connection with a horizontal bar 9 which is strapped on to the usual header balance-arm structure 10. When the thresher end of the walking beam is raised the opposite end of the balance arm is lowered causing the cutter bar to be raised. The above parts and the operation are all standard and the movement of the walking beam as above stated is utilized to obtain the desired adjustment of the reel as will now be described.

The reel 11 which is mounted in the usual position above the cutter bar is preferably of that type shown in my Patent No. 1,645,856, dated October 18, 1927. This reel is supported on the forward ends of horizontal arms 12 which are pivoted intermediate their ends on standards 13 which project upwardly from the header frame 2. The ends of the arms opposite the reel are preferably weighted as at 12$^a$ to partially offset the weight of the reel.

Between the weight and pivot of each arm a cable 14 depends and is connected thereto. The cables from both arms pass over suitable direction changing pulleys 15 mounted on the header and extending thence to and about pulleys 16 which are mounted substantially on the axial plane of the flexible connection means 3 of the header frame. The cables then extend upwardly and converge to a common connection with an adjustable length of chain 17 which is connected to and depends from a bolt 18. This bolt is removably mounted in any one of a number of longitudinally spaced holes 19 drilled through that portion of the walking beam inwardly of its pivot. Owing to this arrangement, as the walking beam is moved to cause the cutter bar to be raised, the cables will be pulled to move the rear portions of the reel supporting arms down, and consequently raise the reel.

The points of connection of the cables with the reel supporting arms and with the walking beam, relative to the pivot of these members, is such that with the movement of the walking beam to raise the cutter bar a certain distance, the reel supporting arms will be moved in the same direction but to a considerably greater extent. Such extent may be adjusted at will to suit different conditions by shifting the position of the bolt 18 in the walking beam.

The placing of the pulleys 16 on the line of swing of the header frame enables the latter to have the necessary freedom of swinging movement without causing the cables to become either unduly slack or taut with such movement of the header. With the ordinary header movements, therefore, such as are caused by ground undulations, no appreciable movement or change of position of the reel takes place.

From the foregoing description it will be readily seen that I have produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A reel adjusting mechanism for a header, said header having a cutter bar and a reel; means for vertically adjusting the cutter bar, which includes a horizontal walking beam the downward movement of one portion of which causes the cutter bar to be raised and arms pivoted intermediate their ends, the reel being supported by said arms adjacent one end thereof; comprising flexible elements extending from the arms toward the other end thereof to the walking beam and connected to that portion thereof which moves up when the cutter bar is raised, and pulleys over which such elements pass arranged to cause such upward movement of the walking beam to impart a pull to said elements.

2. A reel adjusting mechanism for a header, said header having a cutter bar and a reel; means for vertically adjusting the cutter bar, which includes a horizontal walking beam the movement of which in one direction causes the cutter bar to be raised and pivoted reel supporting arms; comprising flexible elements extending between and connected to the arms and walking beam, and pulleys over which the elements pass intermediate their ends; the points of connection of said elements with the arm and beams being such that with said movement of the beam the elements will be pulled and the reel raised to an extent greater than the raising movement imparted to the cutter-bar.

In testimony whereof I affix my signature.

JOHN C. EICHELBERGER.